United States Patent [19]

Brandman et al.

[11] Patent Number: 5,164,989
[45] Date of Patent: Nov. 17, 1992

[54] ECHO CANCELLATION METHODS AND APPARATUS FOR VOICE PROCESSING SYSTEMS

[75] Inventors: Yigal Brandman, Palo Alto; Manoj Puri, Sunnyvale, both of Calif.

[73] Assignee: Octel Communications Corporation, Milpitas, Calif.

[21] Appl. No.: 625,368

[22] Filed: Dec. 11, 1990

[51] Int. Cl.$^5$ .............................................. H04B 3/20
[52] U.S. Cl. ...................................... 379/410; 379/408
[58] Field of Search .................. 379/3, 406, 408, 410; 340/425

[56] References Cited

U.S. PATENT DOCUMENTS

| | | | |
|---|---|---|---|
| 3,183,313 | 12/1960 | Cutler | 379/408 |
| 4,177,361 | 12/1979 | Birch | 379/408 |
| 4,276,450 | 6/1981 | Chowaniec | 379/408 |
| 4,558,187 | 12/1985 | Billi et al. | 379/408 |
| 4,766,589 | 8/1988 | Fisher | 379/408 X |

Primary Examiner—James L. Dwyer
Assistant Examiner—M. Shehata
Attorney, Agent, or Firm—Robert R. Jackson; G. Victor Treyz

[57] ABSTRACT

In a voice processing system employing the telephone communications network, any echo of an outgoing signal is substantially eliminated from the incoming signal by appropriately combining an appropriate version of the outgoing signal with the incoming signal so that there is destructive interference with any echo of the outgoing signal. To determine the appropriate version of the outgoing signal to be combined with the incoming signal, a brief training signal is applied to the telephone transmission line. The echo of this signal returned by the transmission line is stored and convolved with the time-inverse of the training signal to produce a function which approximates the impulse response of the transmission line. This function is thereafter used to produce the version of the outgoing signal which is combined with the incoming signal for echo cancellation. Prior to use, the above-mentioned function may be tested for suitability, and if it is found to be unsuitable, a new function may be generated by repeating the process of the invention.

12 Claims, 4 Drawing Sheets

ECHO CANCELLATION METHODS AND APPARATUS FOR VOICE PROCESSING SYSTEMS

BACKGROUND OF THE INVENTION

This invention relates to voice processing systems, and more particularly to echo cancellation methods and apparatus for use in voice processing systems.

Voice processing systems such as voice mail systems are typically connected to telephone transmission networks. Such networks typically have some transmission line echo, despite industry standards and efforts which are aimed at keeping this problem under control. Echo means that some or all of the transmitted signal is returned to the transmitter after some delay and generally with substantially reduced amplitude. There are many variables associated with echo, and each of these variables is subject to change from one telephone call to the next. For example, the amount of time delay involved, the frequency response, and the amplitude of the returned signal are all echo parameters which can vary considerably from one telephone call to the next, thereby making it impossible to design a single, static circuit which will effectively cancel echo under all conditions.

The typical voice processing system must both transmit signals (such as previously recorded voice messages) via a telephone line, and also automatically respond to signal information (such as dual tone multifrequency ("DTMF") tones) received via that same telephone line. For example, in response to transmission of a prerecorded message, the recipient of that message may use DTMF tones to instruct the voice processing system to perform certain functions such as replay the message, erase the message, go to the next message, etc. The ability to accurately detect and correctly respond to received DTMF tones is therefore essential to proper operation of a voice processing system. However, the echo of transmitted voice messages can sometimes resemble DTMF tones and cause prior art voice processing systems to malfunction. The echo may also be added to incoming DTMF signals, thereby corrupting those signals and preventing their detection.

In view of the foregoing, it is an object of this invention to provide improved echo cancellation methods and apparatus for use in voice processing systems.

It is a more particular object of this invention to provide echo cancellation methods and apparatus for use in voice processing systems which determine the echo characteristics of the telephone transmission line involved in each telephone call and automatically adapt the voice processing system to substantially cancel echoes having those characteristics.

SUMMARY OF THE INVENTION

These and other objects of the invention are accomplished in accordance with the principles of the invention by applying a brief test or training signal to the telephone transmission line involved in each call, preferably at the start of the call. The echo of this training signal is then convolved with the time-inverse of that signal in order to yield a function which approximates the impulse response of the transmission line. Thereafter, the signals transmitted by the voice processing system are also processed in accordance with this impulse response function to produce a modified version of the transmitted signal which substantially matches the echo of that signal returned to the voice processing system by the transmission line. This modified version of the transmitted signal is combined with the signal received from the transmission line so as to destructively interfere with the echo of the transmitted signal in the received signal.

A satisfactory function approximating the impulse response of the transmission line may not always be obtained on the first attempt if, for example, there is noise on the line during transmission of the training signal. The invention therefore includes testing the function to determine whether it is satisfactory, and if not, repeating the steps for producing it.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
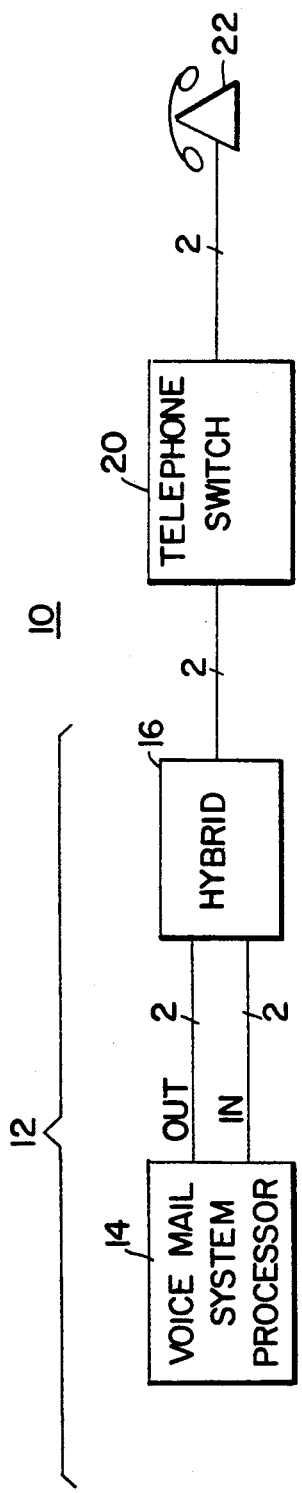
FIG. 1 is a simplified schematic block diagram of a conventional voice processing system in which this invention can be employed.

A typical telephone signalling system 10 including a voice mail system 12 is shown in FIG. 1. For each possible telephone connection, voice mail system 12 is connected to conventional telephone switch 20 via two wires which transmit information bidirectionally. The processor 14 of the voice mail system, on the other hand, has two leads for outgoing signal information, and two other leads for incoming signal information. The interface between these four processor leads and the two wires to telephone switch 20 is conventional hybrid circuit 16. Telephone switch 20 may be a two- or four-wire device; but in any event, two wires are typically used to connect switch 20 to conventional telephone instruments 22 (either directly or via a network of other switches and communication links).

Figure 2:
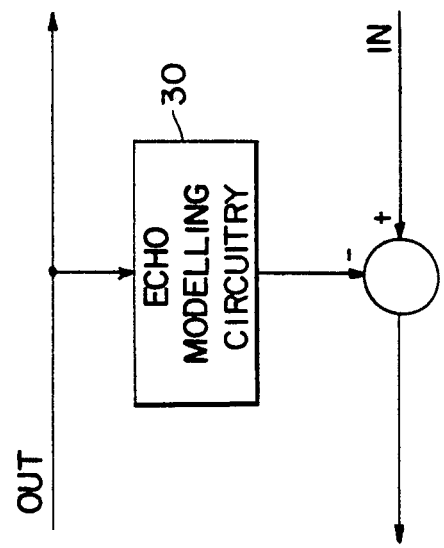
FIG. 2 is a simplified schematic block diagram showing how echo modelling circuitry (which may either be conventional or constructed in accordance with this invention) can be employed in a system like that shown in FIG. 1.
Figure 3A:
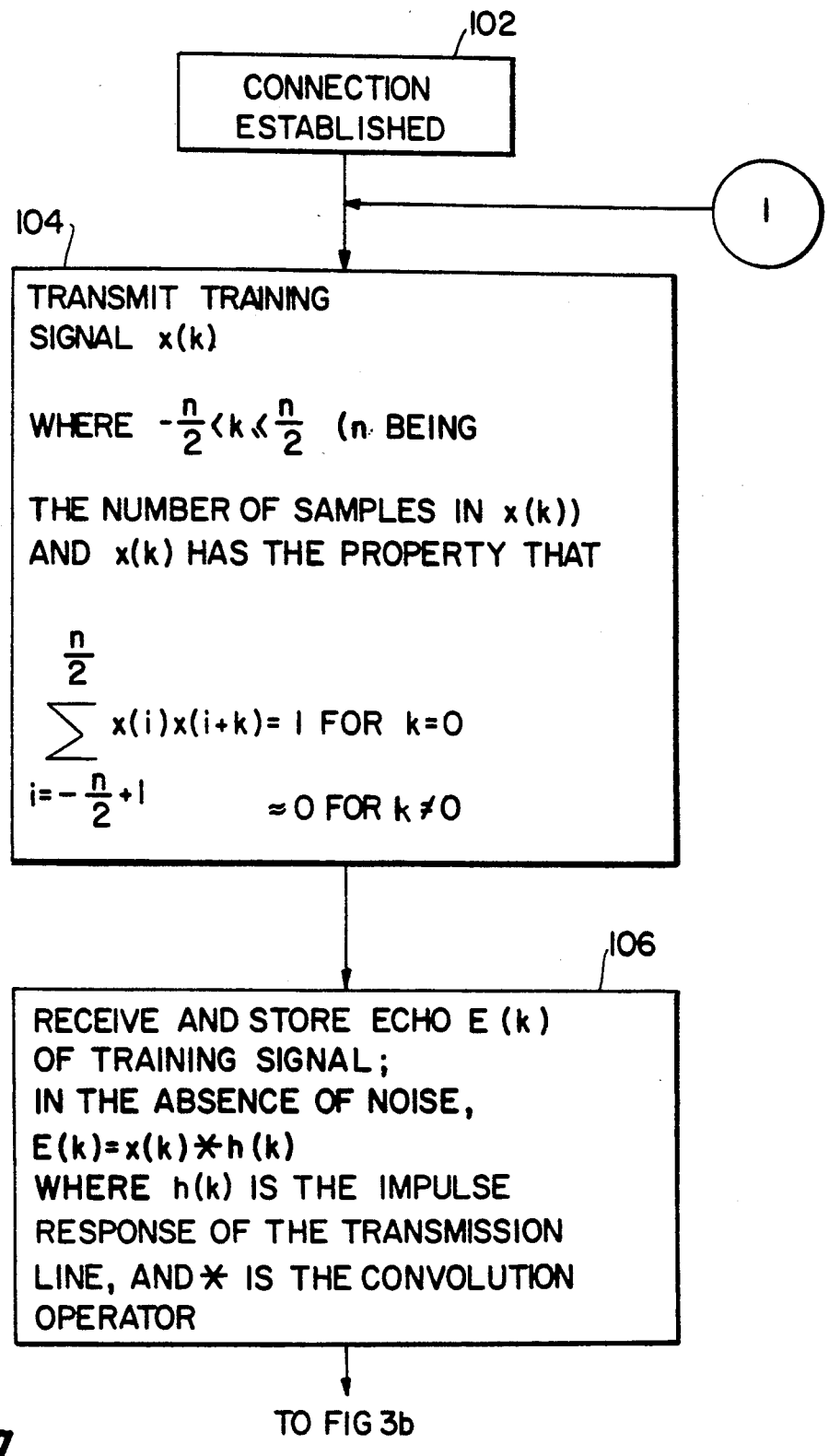
FIG 3a-3b is a flow chart of an illustrative embodiment of the method of this invention. The steps shown in this flow chart may be carried out by suitably programming the processor shown in FIG. 1.
Figure 3B:
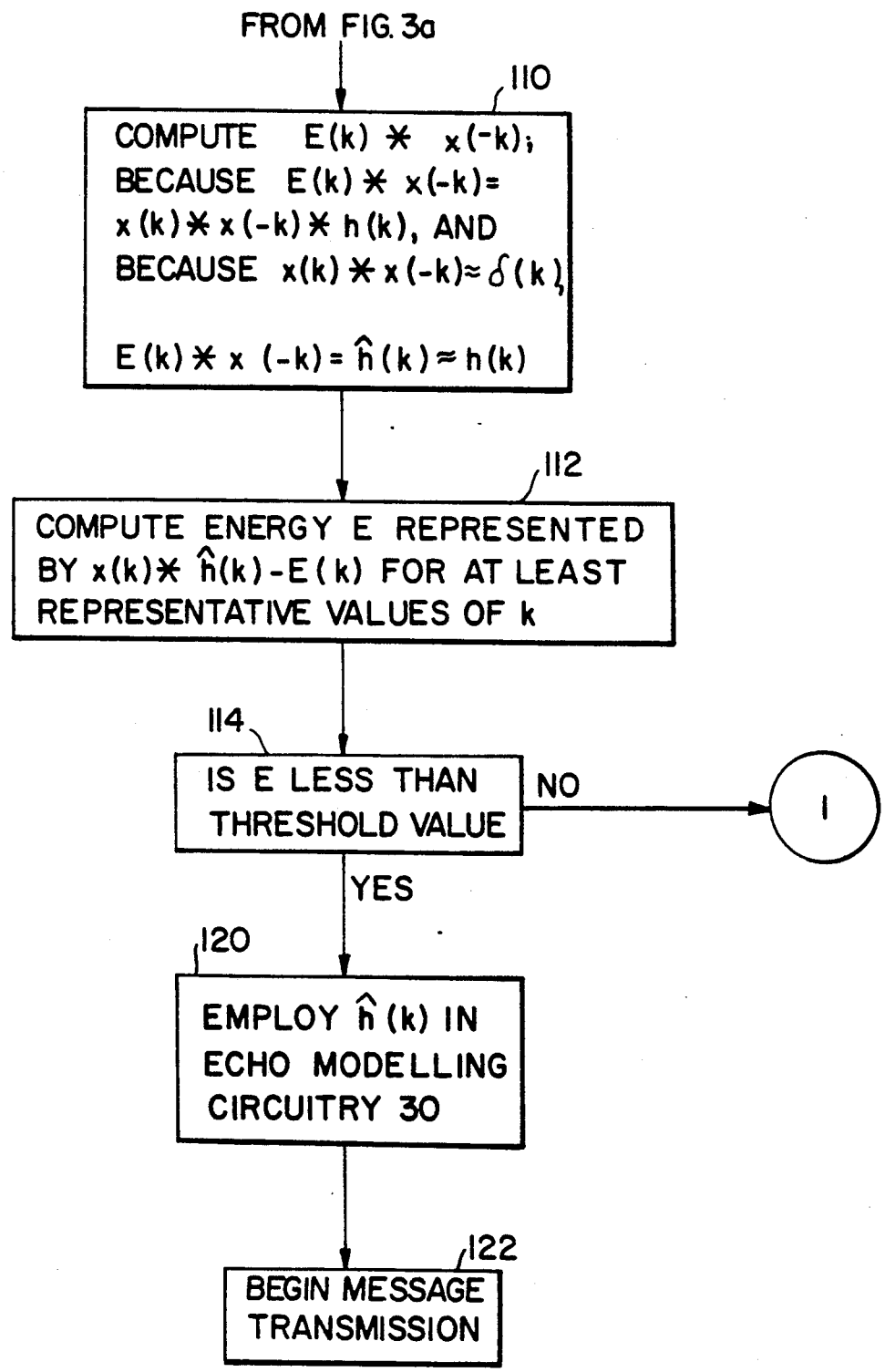

Echo cancellation apparatus is shown in FIG. 2. In processor 14 or between processor 14 and hybrid 16, a version of the outgoing signal (produced by echo modelling circuitry 30) is combined with the incoming signal so as to destructively interfere with the echo of the outgoing signal which is received as part of the incoming signal. Because, as has been mentioned, echo characteristics may vary so much and in so many different respects from one telephone call to the next, it is not possible for any static echo modelling circuitry 30 to do a good job of cancelling echo for all calls. Accordingly, in accordance with this invention, echo modelling circuitry 30 is automatically adapted during each telephone call to compensate for the echo characteristics of that connection as will now be explained with reference to FIG. 3. Echo modelling circuitry 30 may therefore be an adaptive digital filter implemented as part of processor 14.

Figure 4:
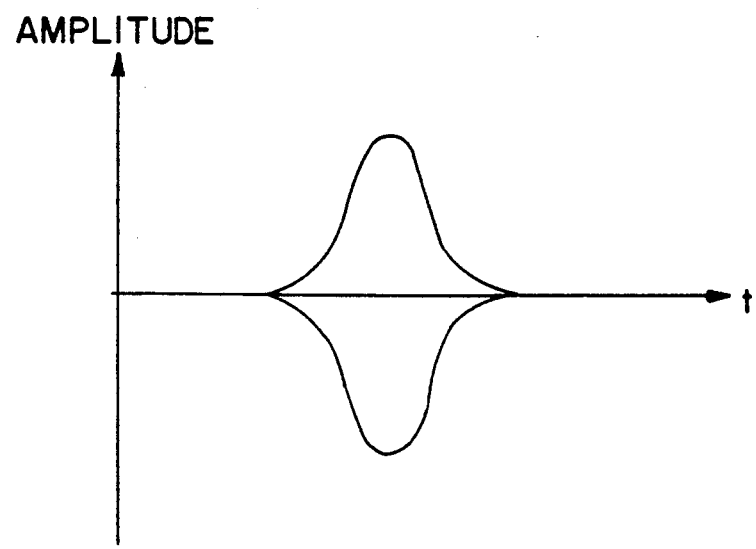
FIG. 4 is a diagram of the envelope of a training signal which can be employed in accordance with this invention.

After each telephone connection is established as indicated by step 102, and while the telephone transmission line is still quiet, processor 14 generates and transmits a brief test or training signal x(k) having the characteristics specified in step 104. Because processor 14 is preferably digital, x(k) is initially produced by processor 14 as a predetermined number and sequence of predetermined digital signal samples. Although other numbers and timings can be used, in the preferred embodiment x(k) comprises 128 samples spanning 16 milliseconds. A typical envelope of x(k) is shown in FIG. 4, and the samples occurring in that envelope are preferably based on the superposition of random, discrete frequencies in the range from 0–4 KHz. The sample sequence used for training is a finite length random sequence (e.g., 128 samples) such that it has an autocorrelation function which approximates an impulse (delta). The training signal should not have a sound which is unpleasant or unacceptable to the user.

It will be noted that the summation in the equation in step 104 is the autocorrelation operator. Accordingly, the requirement that this summation be 1 for k=0 and approximately 0 for all other values of k means that the convolution of x(k) and its time-inverse x(−k) is approximately an impulse (usually denoted δ(k) having one sample of amplitude 1 and all other samples of amplitude 0. Such a pure impulse signal is not used in the present invention because the energy content of the signal would be too low. Hence the above-described training signal x(k) is used instead.

As x(k) is being transmitted, processor 14 begins to collect and store samples E(k) of the incoming signal as shown in step 106. Assuming that the transmission line is quiet, E(k) will be the echo of x(k). As pointed out in step 106, in the absence of noise, E(k) is approximately equal to the convolution of x(k) and the impulse response h(k) of the transmission line.

In step 110, processor 14 computes the convolution of E(k) and x(−k), which as noted above is the time-inverse of x(k). As mentioned in step 110, because E(k) is equal to the convolution of x(k) and h(k), the convolution of E(k) and x(−k) is equal to the convolution of x(k), x(−k), and h(k). But because the convolution of x(k) and x(−k) is approximately equal to δ(k), the convolution of E(k) and x(−k) (denoted hat h(k) is approximately equal to h(k).

The objective of the invention is to use hat h(k) for echo cancellation. However, it should first be established that hat h(k) is a satisfactory approximation of h(k), the actual impulse response of the transmission line. This may not be the case, for example, if there was a significant amount of noise received with the echo of x(k). Accordingly, steps 112 and 114 are performed to test the suitability of hat h(k). In particular, as shown in step 112, the energy E contained in the difference between the convolution of x(k) and hat h(k), on the one hand, and E(k), on the other hand, for at least representative values of k is computed. Then in step 114, E is compared to a predetermined threshold value. If E is less than the threshold value, hat h(k) is deemed acceptably close to h(k), and hat h(k) is used in echo modelling circuitry 30 as shown in step 120. Thereafter, processor 14 begins regular message transmission as shown in step 122. If E is not less than the threshold value, control passes from step 114 to step 104 where the entire process is repeated in order to determine a new hat h(k). If desired, in the return path from step 114 to step 104, a counting step can be provided to count the number of attempts which have been made to arrive at a satisfactory hat h(k) and to cause escape from this loop (to step 122) after a predetermined number of unsuccessful attempts. If processor 14 arrives at step 122 in this way, a flag may also be set in the processor. Thereafter, processor 14 may periodically again attempt to determine an acceptable hat h(k), e.g., by again performing steps 104-120 each time processor 14 is about to enter the transmit mode until a hat h(k) is found which satisfies the test of step 114.

To simplify computations in the preferred embodiment, actual energy is not computed in step 112. Instead, the absolute values of the differences between x(k) * hat h(k) and E(k) for at least representative values of k are added to give a quantity indicative of the energy represented by these differences. Because the convolution of E(k) and x(−k) yields 256 samples, in the preferred embodiment only 64 samples (e.g., sample 128 to sample 192) are used.

It will be understood that the foregoing is merely illustrative of the principles of this invention, and that various modifications can be made by those skilled in the art without departing from the scope and spirit of the invention. For example, the length of x(k) may vary, and the number of samples of hat h(k) employed in echo modelling circuitry 30 may also vary.

The invention claimed is:

1. A voice processing system which applies an outgoing signal to a telephone connection and which receives and responds to an incoming signal from said telephone connection comprising:

echo modelling circuitry for applying a predetermined test signal to said telephone connection, said predetermined test signal, having the property that when said test signal is convolved with a time-inverse of said test signal a function that is approximately equal to an impulse is produced, said echo modelling circuitry analyzing the incoming signal subsequent to application of said test signal in order to determine how said test signal must be modified in accordance with an approximate impulse response that is calculated by said echo modelling circuitry so that when said test signal is combined with said incoming signal any echoes of said test signal present in said incoming signal are substantially eliminated, said echo modelling circuitry modifying said outgoing signal in accordance with said approximate impulse response to produce a modified version of said outgoing signal and subsequently combining said modified version of said outgoing signal with said incoming signal to substantially eliminate any echo of said test signal in said incoming signal.

2. The apparatus defined in claim 1 wherein said echo modelling circuitry is operative each time a new telephone connection is established in order to adapt said voice processing system for each said new telephone connection.

3. The apparatus defined in claim 2 wherein said echo modelling circuitry is operative shortly after each new telephone connection is made.

4. The apparatus defined in claim 1 wherein said test signal is a pulse containing a plurality of random, discrete signal frequencies.

5. The apparatus defined in claim 1 wherein said test signal is a finite length random sequence.

6. The apparatus defined in claim 5 wherein said finite length random sequence is selected such that its autocorrelation function is approximately an impulse.

7. A voice processing system which applies an outgoing signal to a telephone connection and which receives and responds to an incoming signal from said telephone connection comprising:

echo modelling circuitry for applying a training signal to said telephone connection, said training signal having the property that when said training signal is convolved with a time-inverse of said training signal, a result that is approximately equal to an impulse is produced, said echo modelling circuitry receiving and storing any echo of said training signal returned to said voice processing system from said telephone connection and subsequently convolving said echo with the time-inverse of said training signal to produce a function which approximates the impulse response of said telephone connection, said echo modelling circuitry thereafter using said function to process said outgoing signal to produce a version of said outgoing signal which approximates the echo of said outgoing signal that will be returned to said voice processing system from said telephone connection, and said echo modelling circuitry combining said version of said outgoing signal with said incoming signal so as to cause said version of said outgoing signal to substantially cancel said echo of said outgoing signal in said incoming signal.

8. The apparatus defined in claim 7 further comprising:

a portion of said echo modelling circuitry configured for testing the suitability of said function for use in processing said outgoing signal before allowing said function to be used by said echo modelling circuitry, wherein said echo modelling circuitry is further configured for computing a quantity indicative of the energy in the difference between (1) the convolution of said training signal and said function and (2) said echo of said training signal, comparing said quantity to a predetermined threshold value, allowing said function to be used only if said quantity is less than said predetermined threshold value, and causing repeated applying, receiving, storing, and convolving if said quantity is not less than said predetermined threshold value.

9. A method of operating a voice processing system which applies an outgoing signal to a telephone connection and which receives and responds to an incoming signal from said telephone connection comprising the steps of:

applying a training signal to said telephone connection, said training signal having the property that when said training signal is convolved with a time-inverse of said training signal a result that is approximately equal to an impulse is produced;

receiving and storing any echo of said training signal returned to said voice processing system from said telephone connection;

convolving said echo with the time-inverse of said training signal to produce a function which approximates the impulse response to said telephone connection;

thereafter using said function to process said outgoing signal to produce a version of said outgoing signal which approximates the echo of said outgoing signal that will be returned to said voice processing system from said telephone connection; and combining said version of said outgoing signal with said incoming signal so as to cause said version of said outgoing signal to substantially cancel said echo of said outgoing signal in said incoming signal.

10. The method defined in claim 9 further comprising the step of:

testing the suitability of said function for use in processing said outgoing signal before allowing said function to be used.

11. The method defined in claim 10 wherein said testing step further comprises the steps of:

computing a quantity indicative of the energy in the difference between (1) the convolution of said training signal and said function and (2) said echo of said training signal;

comparing said quantity to a predetermined threshold value; and allowing said function to be used in said using step only if said quantity is less than said predetermined threshold value.

12. The method defined in claim 11 further comprising the step of:

repeating said applying step, said receiving and storing step, and said convolving step if said quantity is not less than said predetermined threshold value.

* * * * *